United States Patent
Gwidt et al.

(10) Patent No.: US 7,322,339 B1
(45) Date of Patent: Jan. 29, 2008

(54) APPARENT TORQUE RESERVE AT IDLE FOR DIRECT INJECTED ENGINES

(75) Inventors: Jesse M. Gwidt, Brighton, MI (US); David P. Sczomak, Troy, MI (US); Matthew A. Wiles, Royal Oak, MI (US); Michael J. Lucido, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/530,678

(22) Filed: Sep. 11, 2006

(51) Int. Cl.
*F02B 3/10* (2006.01)

(52) U.S. Cl. ............ 123/299; 123/339.12; 123/339.16; 123/680

(58) Field of Classification Search ................ 123/299, 123/490, 680, 339.12, 339.16, 339.17, 339.18
See application file for complete search history.

(56) References Cited

U.S. PATENT DOCUMENTS

| | | | | |
|---|---|---|---|---|
| 4,836,161 A | * | 6/1989 | Abthoff et al. | 123/299 |
| 5,875,757 A | * | 3/1999 | Mizuno | 123/295 |
| 5,904,128 A | * | 5/1999 | Shimada et al. | 123/339.12 |
| 6,336,335 B2 | * | 1/2002 | Ota et al. | 62/133 |
| 7,194,996 B2 | * | 3/2007 | Koopmans | 123/295 |
| 2004/0154581 A1 | * | 8/2004 | Yamaoka et al. | 123/299 |
| 2006/0174853 A1 | * | 8/2006 | Koopmans | 123/295 |

* cited by examiner

*Primary Examiner*—Erick Solis

(57) ABSTRACT

A fuel injection system for a direct fuel injection (DFI) engine is provided. The system includes: injection mode module selects a fuel injection mode to be one of a single injection mode and a dual injection mode during DFI engine idle operation based on a torque request; and a fuel injection command module that commands fuel injection events based on a crankshaft position and the fuel injection mode.

20 Claims, 4 Drawing Sheets

APPARENT TORQUE RESERVE AT IDLE FOR DIRECT INJECTED ENGINES

FIELD

The present disclosure relates to methods and systems for direct fuel injection engines.

BACKGROUND

The statements in this section merely provide background information related to the present disclosure and may not constitute prior art.

Controlling the amount of fuel and air to be delivered per cylinder for a four stroke internal combustion engine is important to achieve optimum performance. Proper timing of intake and exhaust valves also provide for better performance. Conventional engines include camshafts that regulate the timing of the valves. The rotation of the camshaft can be controlled to ensure proper timing of each valve. In addition cam phasers may be included to alter the position of the camshafts relative to the crankshaft which provides for further opportunities to properly adjust the timing of each valve.

The placement of fuel injectors within the engine and the control of fuel injection timing also impacts engine performance. Port fuel injection engines locate one fuel injector per cylinder, mounted in the intake manifold near the cylinder head. Each injector may be controlled either individually or by groups to inject fuel near the intake valve. Spark-ignited direct injected (SIDI) engines locate one fuel injector per cylinder, mounted directly over the cylinder head. Each injector is controlled individually to inject fuel directly into the cylinder.

Conventional methods of controlling fuel during idle conditions, whether in a port fuel injected engine or a SIDI engine, intentionally retard spark timing in order to provide a reserve torque. Spark timing is then advanced when a request for torque is initiated. This allows the engine to respond to load demands (i.e. power steering "cramp" input) during idle operation. Retarding spark at idle provides for sub-optimal efficiency.

SUMMARY

Accordingly, a fuel injection system for a direct fuel injection (DFI) engine is provided. The system includes: injection mode module selects a fuel injection mode to be one of a single injection mode and a dual injection mode during DFI engine idle operation based on a torque request; and a fuel injection command module that commands fuel injection events based on a crankshaft position and the fuel injection mode.

In other features, a fuel injection method for a direct fuel injection (DFI) engine is provided. The method includes: operating the engine in an idle state. During the idle state: commanding fuel at a first rate during a combustion cycle; receiving a request to increase torque; transitioning to a dual injection mode based on the request; and commanding fuel at a second rate and at a third rate during the combustion cycle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
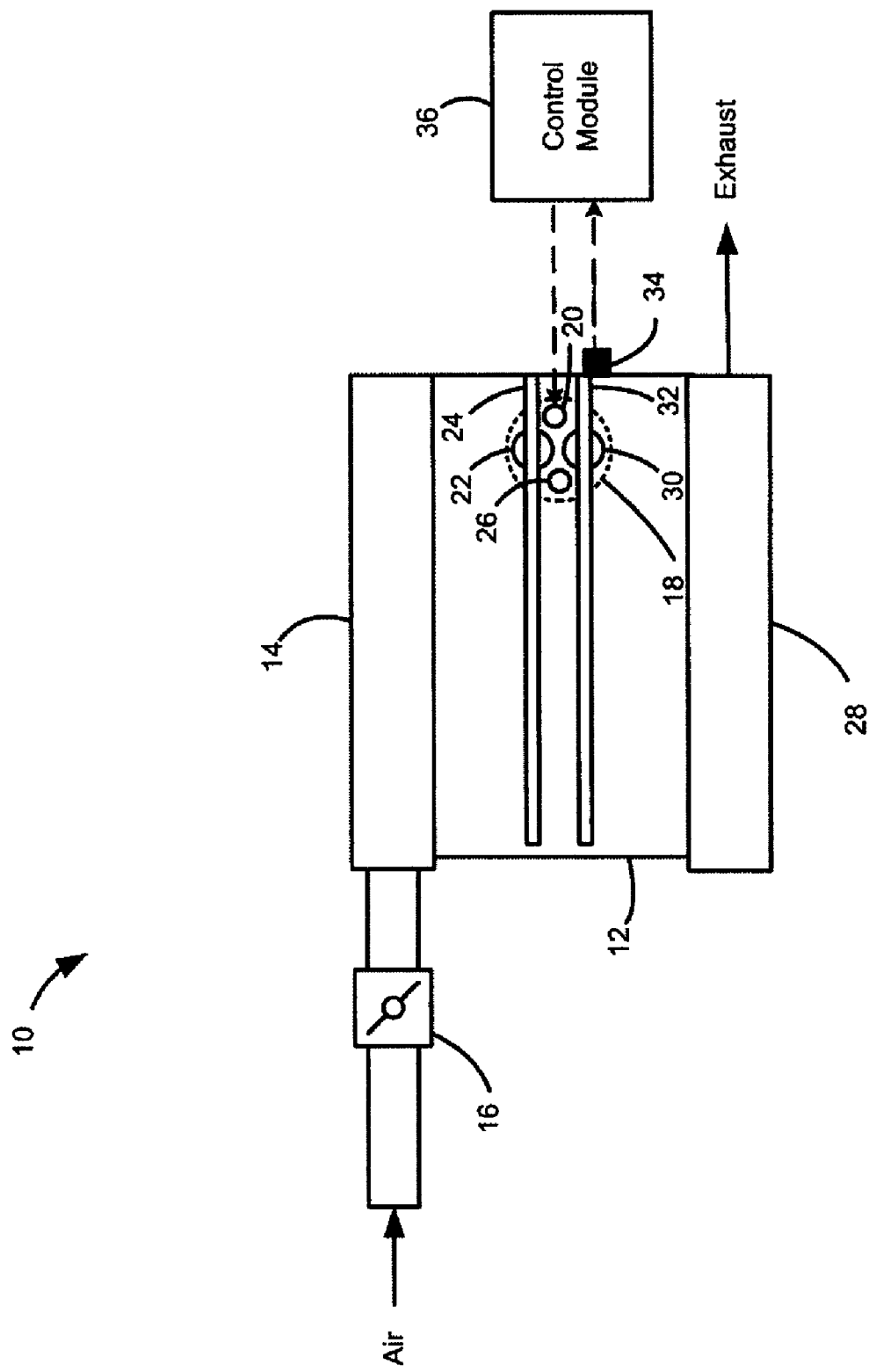
FIG. 1 is a functional block diagram illustrating an internal combustion engine system including direct fuel injection hardware.

The following description is merely exemplary in nature and is in no way intended to limit the disclosure, its application, or uses. For purposes of clarity, the same reference numbers will be used in the drawings to identify the same elements. As used herein, the term module and/or device refers to an application specific integrated circuit (ASIC), an electronic circuit, a processor (shared, dedicated, or group) and memory that execute one or more software or firmware programs, a combinational logic circuit and/or other suitable components that provide the described functionality.

Referring now to FIG. 1, an engine system 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although a single cylinder 18 is illustrated, it can be appreciated that the engine can have a plurality of cylinders including, but not limited to, 2, 3, 5, 6, 8, 10, 12 and 16 cylinders.

A fuel injector 20 is electronically controlled to inject fuel into the cylinder 18. Fuel is combined with air as it is drawn into the cylinder 18 through the intake port. An intake valve 22 selectively opens and closes to enable the air to enter the cylinder 18. The intake valve position is regulated by an intake camshaft 24. A piston (not shown) compresses the air/fuel mixture within the cylinder 18. A spark plug 26 initiates combustion of the air/fuel mixture, driving the piston in the cylinder 18. The piston drives a crankshaft (not shown) to produce drive torque. Combustion exhaust within the cylinder 18 is forced out through an exhaust manifold 28 when an exhaust valve 30 is in an open position. The exhaust valve position is regulated by an exhaust camshaft 32. The exhaust can then be treated in an exhaust system (not shown). Although single intake and exhaust valves 22,30 are illustrated, it can be appreciated that the engine 12 can include multiple intake and exhaust valves 22,30 per cylinder 18.

A crankshaft sensor 34 senses a position of the crankshaft and generates a crankshaft signal. A control module 36 receives the crankshaft signal, interprets the signal as degrees of rotation and schedules fuel injection events based on the interpretation of the signal. The control module 36 sends a fuel injection signal to the fuel injector to control the amount and the timing of the fuel delivery. The fuel injection signal can be a pulse width modulated signal where the pulse width regulates the amount of fuel delivered to the cylinder.

Figure 2:
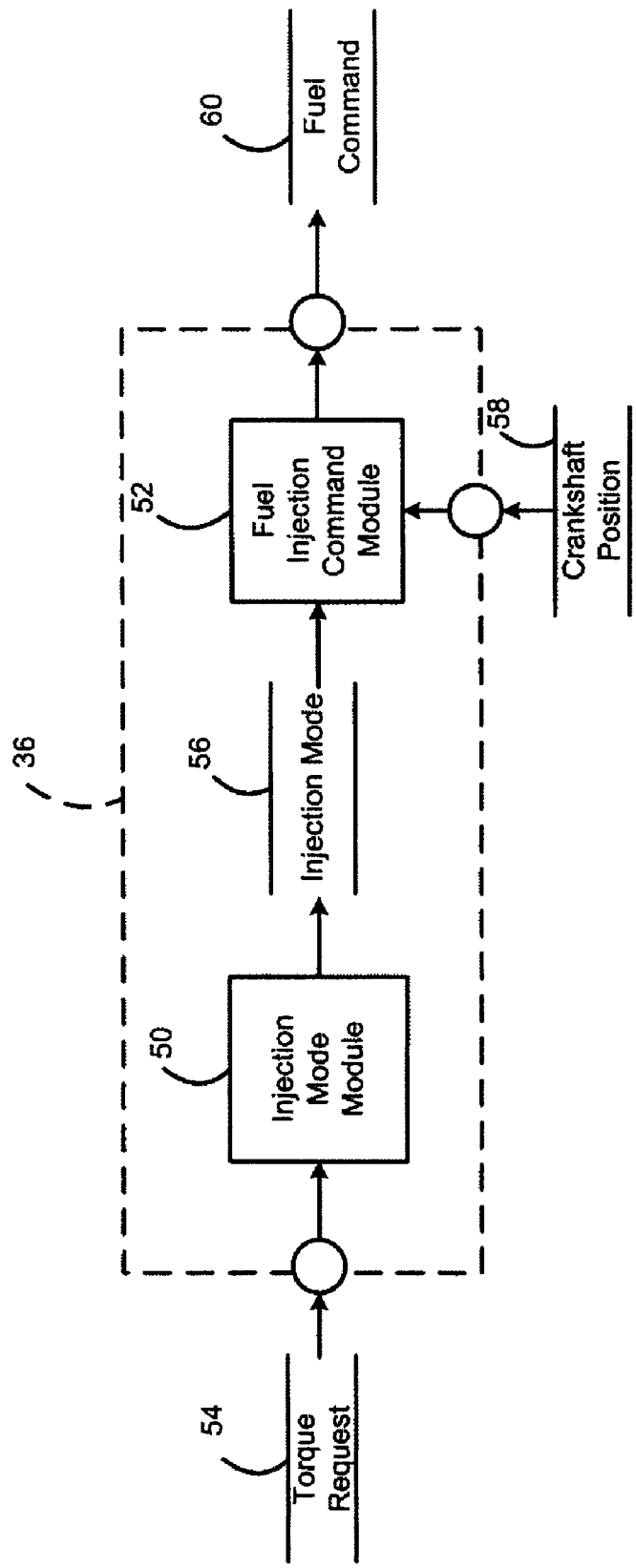
FIG. 2 is a dataflow diagram illustrating a fuel injection system.

Referring now to FIG. 2, the present disclosure provides a control method and system that governs the transitions between single and dual fuel injection modes during idle conditions. A dataflow diagram illustrates various embodiments of the fuel injection system that may be embedded within the control module 36. Various embodiments of fuel injection systems according to the present disclosure may include any number of sub-modules embedded within the control module 36. The sub-modules shown may be combined and/or further partitioned to similarly govern the transitions between the single injection mode and the dual injection mode during idle conditions.

In various embodiments, the control module 36 of FIG. 2 includes an injection mode module 50 and a fuel injection command module 52. The injection mode module 50 receives as input a torque request 54. As can be appreciated, the inputs to the system may be sensed from the system 10, received from other control modules (not shown) in the system, or determined from other sub-modules within the control module 36. The injection mode module 50 selects an injection mode 56 to be one of a single injection mode and a dual injection mode based on the torque request 54.

The fuel injection command module 52 receives as input the injection mode 56 and a crankshaft position 58. The fuel injection command module 52 schedules fuel injection events and commands fuel 60 based on the injection mode 56 and the crankshaft position 58.

Figure 3:
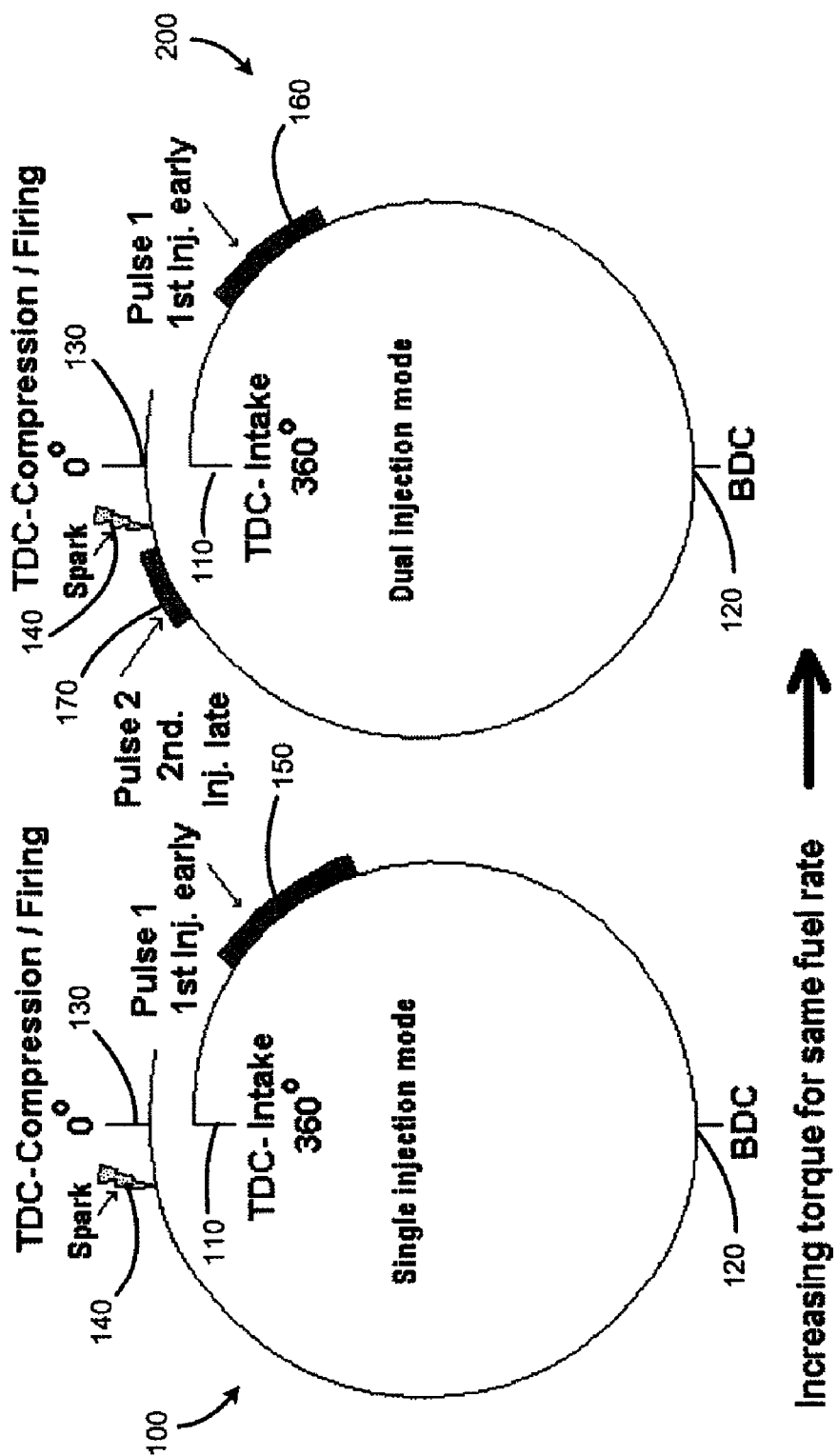
FIG. 3 is timing diagrams illustrating the scheduling of fuel injection events during a single injection mode and a dual injection mode.
Figure 4:
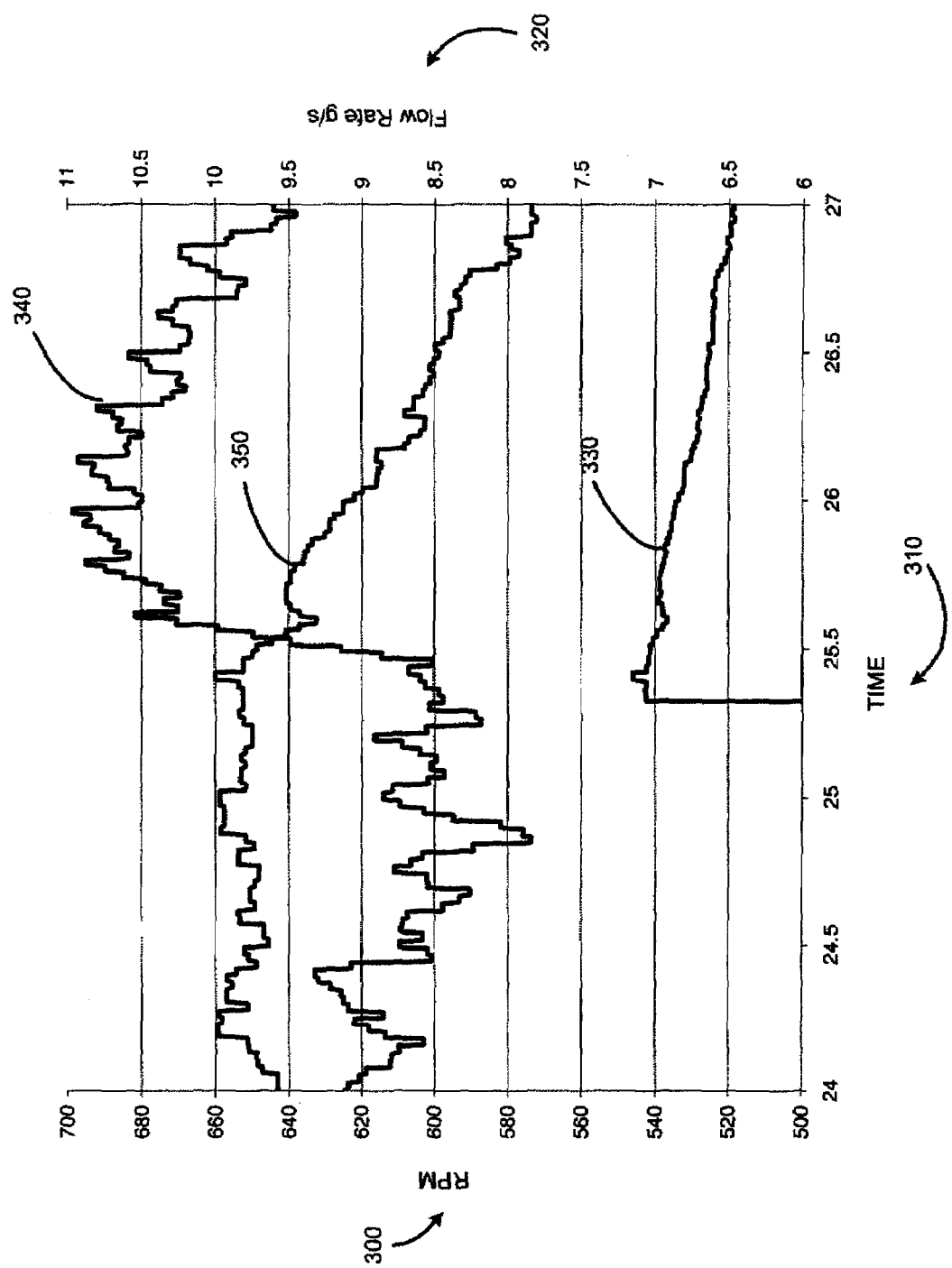
FIG. 4 is a graph illustrating the effects of switching between the single injection mode and the dual injection mode on engine speed and fuel flow rates.

Referring now to FIG. 3, timing diagrams for scheduling fuel injection events according to the present disclosure are shown. During engine idle operating conditions, control begins in the single injection mode shown generally at 100. During the single injection mode, one injection event is scheduled per cylinder per combustion cycle. If during idle conditions, an increase in torque is requested, control switches to a dual injection mode shown generally at 200. During the dual injection mode, two injection events are scheduled per cylinder per combustion cycle. This generates an increase in torque without increasing fuel consumption.

More specifically, fuel injection events can be scheduled according to the crankshaft position indicated by degrees of crank rotation. A crankshaft signal can be interpreted as a position in crank degrees. Each diagram illustrates the position of the crankshaft in crank degrees during a combustion cycle. The combustion cycle includes the piston performing the intake stroke and the combustion stroke. The piston begins the intake stroke at three hundred sixty (360) crank rotation degrees before top dead center at 110. The piston begins the combustion stroke at one hundred eighty (180) crank rotation degrees before top dead center (also referred to bottom dead center (BDC)) at 120. The piston ends the combustion stroke at top dead center or zero (0) crank rotation degrees shown at 130. Firing of spark for both the single injection mode 100 and the dual injection mode 200 occurs near top dead center of the combustion stroke at 140. In an exemplary embodiment firing occurs between ten (10) and zero (0) crank degrees before top dead center.

When in the single injection mode 100, a single injection event is scheduled early in the combustion cycle. The injection event is scheduled early in the combustion cycle and can be scheduled anywhere between two hundred fifty (250) and three hundred eighty (380) crank degrees before firing of spark. An exemplary range for scheduling the fuel delivery is between two hundred and seventy (270) and three hundred and thirty (330) crank degrees before firing of spark as shown at 150. The single injection mode 100 delivers less torque than dual injection for the same conditions but allows for spark timing to be near minimum best torque (MBT) to improve efficiency.

If an increase in torque is requested, control switches to the dual injection mode 200 and commands two fuel injection events per cylinder per combustion cycle. The first injection event is scheduled early in the combustion cycle and can be scheduled anywhere between two hundred fifty (250) and three hundred eighty (380) crank degrees before firing of spark. An exemplary range for scheduling the first fuel delivery is between two hundred and seventy (270) and three hundred and thirty (330) crank degrees before firing of spark as shown at 160. The amount of fuel delivered however, is reduced compared to homogeneous operating conditions. In an exemplary embodiment, the amount of fuel delivered is between twenty (20) and ninety (90) percent of the total required fuel for the combustion stroke.

The second fuel injection event is scheduled late in the combustion cycle and can be scheduled anywhere between zero (0) and one hundred eighty (180) crank degrees before firing of spark. An exemplary range for scheduling the second fuel delivery is between twenty (20) and ninety (90) crank degrees before firing of spark as shown at 170. The second injection event injects the remainder of fuel necessary for the combustion cycle. An exemplary amount includes ten (10) to eighty percent (80) of the total fuel required for the combustion stroke.

Referring now to FIG. 3, a graph illustrates the impact on engine speed and fuel economy when controlling the fuel injection events according to the present method. Engine speed in RPM is shown along the y-axis at 300. Time in seconds is shown along the x-axis at 310. Fuel flow rate in g/s is shown along the y-axis at 320. Dual pulse active data is shown at 330. Engine speed data is shown at 340. Fuel flow rate data is shown at 350. As shown by the data, when the dual injection mode is active, engine speed increases, thus compensating for the increase in load. Fuel flow rate decreases to improve fuel economy.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A fuel injection system for a direct fuel injection (DFI) engine, comprising:
   an injection mode module that selects a fuel injection mode to be one of a single injection mode and a dual injection mode during DFI engine idle operation based on a torque request; and
   a fuel injection command module that commands fuel injection events based on a crankshaft position and the fuel injection mode.

2. The system of claim 1 wherein the fuel injection command module commands fuel at a first rate when the crankshaft position is within a first predetermined range during the single injection mode.

3. The system of claim 1 wherein the fuel injection command module commands fuel at a second rate and at a third rate when the crankshaft position signal indicates a crankshaft position within second and third predetermined ranges respectively during the dual injection mode.

4. The system of claim 2 wherein the first predetermined range is between two hundred and fifty and three hundred and eighty crank rotation degrees before spark is commanded near top dead center.

5. The system of claim 3 wherein the second predetermined range is between two hundred and fifty and three hundred and eighty crank rotation degrees before spark is commanded near top dead center.

6. The system of claim 3 wherein the third predetermined range is between zero and one hundred and eighty crank rotation degrees before spark is commanded near top dead center.

7. The system of claim 3 wherein the fuel injection command module determines the second and the third rates based on a total fuel required for the combustion cycle and wherein the total fuel required is determined from engine operating conditions and torque requests.

8. The system of claim 3 wherein the second and the third rate is based on a first and a second predetermined percentage of the total fuel required for the combustion cycle, wherein the first predetermined percentage is greater than the second predetermined percentage.

9. The system of claim 8 wherein the first predetermined percentage is between twenty and ninety percent of the total fuel and wherein the second predetermined percentage is between ten and eighty percent of the total fuel.

10. A fuel injection method for a direct fuel injection (DFI) engine, comprising:
   operating the engine in an idle state; and
   wherein during the idle state:
   commanding fuel at a first rate during a combustion cycle;
   receiving a request to increase torque;
   transitioning to a dual injection mode based on the request; and
   commanding fuel at a second rate and at a third rate during the combustion cycle.

11. The method of claim 10 wherein the commanding fuel at a first rate and the commanding fuel at a second and at a third rate is based on a crankshaft position.

12. The method of claim 11 wherein the commanding fuel at a first rate further comprises commanding fuel at a first rate when the crankshaft position is within a first predetermined range during the combustion cycle of an engine cylinder.

13. The method of claim 11 wherein the commanding fuel at a second rate and at a third rate further comprises commanding fuel at a second rate when the crankshaft position is within a second predetermined range and commanding fuel at a third rate when the crankshaft position is within a third predetermined range during the combustion cycle of the engine cylinder.

14. The method of claim 10 further comprising commanding spark when the crankshaft position is near top dead center during the single injection mode and the dual injection mode.

15. The method of claim 10 wherein the commanding fuel at a first rate further comprises commanding fuel at a first rate when an engine crankshaft position is within a range of two hundred and fifty and three hundred and eighty degrees of crank rotation before top dead center firing.

16. The method of claim 10 wherein the commanding fuel at a second rate further comprises commanding fuel at a second rate when an engine crankshaft position is within a range of two hundred and fifty and three hundred and eighty degrees of crank rotation before top dead center firing and wherein the commanding fuel at a third rate further comprises commanding fuel at a third rate when a crankshaft position is within a range of zero and one hundred and eighty degrees of crank rotation before top dead center firing.

17. The method of claim 10 wherein the commanding fuel at a second rate is based on a predetermined percentage of a total fuel desired for the combustion cycle.

18. The method of claim 17 wherein the commanding fuel at a second rate is based on the predetermined percentage that is between twenty and ninety percent of total fuel desired for the combustion cycle.

19. The method of claim 10 wherein the commanding fuel at the third rate is based on a predetermined percentage of a total fuel desired for the combustion cycle.

20. The method of claim 19 wherein the commanding fuel at the third rate is based on the predetermined percentage that is between ten and eighty percent of total fuel desired for the combustion cycle.

* * * * *